US010489162B2

(12) United States Patent
Kondapi et al.

(10) Patent No.: US 10,489,162 B2
(45) Date of Patent: Nov. 26, 2019

(54) SYSTEM AND METHOD OF UPDATING AN INFORMATION HANDLING SYSTEM VIA OUT-OF-BAND DATA TRANSFER

(71) Applicant: Dell Products L.P., Round Rock, TX (US)

(72) Inventors: Srikanth Kondapi, Austin, TX (US); Nathan F. Martell, Taylor, TX (US); Joseph Kozlowski, Jr., Hutto, TX (US); Abeye Teshome, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 15/588,374

(22) Filed: May 5, 2017

(65) Prior Publication Data

US 2018/0321847 A1  Nov. 8, 2018

(51) Int. Cl.
*G06F 9/44* (2018.01)
*G06F 9/4401* (2018.01)
*G06F 9/30* (2018.01)
*G06F 8/654* (2018.01)

(52) U.S. Cl.
CPC .......... *G06F 9/4401* (2013.01); *G06F 8/654* (2018.02); *G06F 9/30043* (2013.01)

(58) Field of Classification Search
CPC ... G06F 3/0443; G06F 9/30043; G06F 9/4401
See application file for complete search history.

(56) References Cited

U.S. PATENT DOCUMENTS

| 9,154,299 | B2 * | 10/2015 | Beachem | H04L 9/0894 |
| 9,927,858 | B2 * | 3/2018 | Garg | H04L 12/12 |
| 9,930,207 | B2 * | 3/2018 | Sekine | H04N 1/2104 |
| 2005/0166213 | A1 * | 7/2005 | Cromer | H04L 12/12 |
| | | | | 719/315 |
| 2013/0205063 | A1 * | 8/2013 | Zhang | G06F 11/1415 |
| | | | | 711/102 |

(Continued)

OTHER PUBLICATIONS

Distributed Management Task Force, Inc., "Platform Level Data Model (PLDM) for Platform Monitoring and Control Specification." (2009); 162 pages, Mar. 16, 2009.

*Primary Examiner* — Henry Tsai
*Assistant Examiner* — Christopher Daley
(74) *Attorney, Agent, or Firm* — Baker Botts L.L.P.

(57) ABSTRACT

In one or more embodiments, one or more systems, method, and/or processes may receive processor instructions via an out-of-band system of an information handling system (IHS) and store the processor instructions via a storage device. For example, the processor instructions may be stored via a hidden partition of the storage device. While the out-of-band system receives the processor instructions, one or more of the IHS and a processor of the IHS may be in a low-power state. For example, the processor may not execute any instructions in the low-power state. While the out-of-band system receives the processor instructions, one or more of the IHS, an operating system of the IHS, and IHS firmware of the IHS may be impaired or inoperable, and the processor instructions may provide one or more remedies and/or repairs. In one or more embodiments, the IHS may be booted after the processor instructions are stored.

20 Claims, 9 Drawing Sheets

(56) References Cited

U.S. PATENT DOCUMENTS

| | | | |
|---|---|---|---|
| 2014/0032818 A1* | 1/2014 | Chang | G06F 3/0685 |
| | | | 711/103 |
| 2014/0337004 A1* | 11/2014 | Maity | G06F 9/4401 |
| | | | 703/25 |
| 2015/0220452 A1* | 8/2015 | Purkayastha | G06F 12/1009 |
| | | | 711/103 |
| 2016/0019116 A1 | 1/2016 | Gopal et al. | |
| 2016/0119150 A1* | 4/2016 | Robison | H04L 63/062 |
| | | | 713/158 |
| 2016/0344998 A1* | 11/2016 | Zheng | H04N 19/597 |
| 2017/0242686 A1* | 8/2017 | Vidyadhara | G06F 8/656 |
| 2018/0157515 A1* | 6/2018 | Malloy | G06F 13/00 |
| 2018/0159771 A1* | 6/2018 | Malloy | H04L 45/7453 |
| 2018/0165455 A1* | 6/2018 | Liguori | G06F 21/575 |

\* cited by examiner

SYSTEM AND METHOD OF UPDATING AN INFORMATION HANDLING SYSTEM VIA OUT-OF-BAND DATA TRANSFER

BACKGROUND

Field of the Disclosure

This disclosure relates generally to information handling systems and more particularly to providing events of information handling systems to one or more subscribers.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the past, information handling system required an operating system to be executing to update one or more of firmware of the information handling system, the operating system, a basic input/output system (BIOS) of the information handling system, and device drivers. Additionally, a person was usually required to manage these updates. Moreover, the information handling system needed to be booted. For example, the information handling system could not be in a low-power state for these updates to occur. Further, a corrupted information handling system, such as a hacked information handling system, an information handling system with an impaired or inoperable BIOS and/or operating system could not be repaired remotely.

SUMMARY

In one or more embodiments, an out-of-band system of an information handling system may receive processor instructions, executable via a processor of an information handling system and provide the processor instructions to an embedded controller of the information handling system. For example, the processor instructions may include at least one of information handling system firmware, an application, a firmware update for the information handling system, an operating system, a device driver configured to be utilized with the operating system, a component configured to be utilized with the operating system, and an update configured to be utilized with the operating system. The embedded controller may receive the processor instructions and store the processor instructions via a non-volatile storage device. In one or more embodiments, the non-volatile storage device may include multiple partitions. For example, a first partition of the multiple partitions may include one or more of an operating system and applications, among others. In one instance, storing the processor instructions via the non-volatile storage device may include storing the processor instructions via the first partition. In another instance, storing the processor instructions via the non-volatile storage device may include storing the processor instructions via a second partition, different from the first partition, of the multiple partitions. In one or more embodiments, the second partition may be a hidden partition. In one or more embodiments, the information handling system may be booted. For example, an operating system may be executed when the information handling system is booted. In one or more embodiments, the operating system of the information handling system may be notified of an availability of the processor instructions.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, processor instructions, executable via a processor of an information handling system (IHS), may be received via an out-of-band system of the IHS. For example, a management controller of the IHS may receive, independently of the processor and via a network interface of the IHS, the processor instructions. For instance, the management controller may receive the processor instructions from a management console, or other IHS, via a network. In one or more embodiments, the processor instructions may include at least one of information handling system firmware, an application (APP), a firmware update for the IHS, an operating system, a device driver configured to be utilized with the operating system or another operating system, a component configured to be utilized with the operating system or the other operating system, and an update configured to be utilized with the operating system or the other operating system, among others.

In one or more embodiments, an embedded controller of the IHS may receive, independently of the processor, the processor instructions from the out-of-band system of the IHS. For example, the embedded controller may receive, independently of the processor, the processor instructions from the out-of-band system via a multipart transfer operation. In one or more embodiments, the embedded controller may store, independently of the processor, the processor instructions via a non-volatile storage device. For example, the IHS may include the non-volatile storage device. In one or more embodiments, the non-volatile storage device may include multiple partitions. For example, a first partition of the multiple partitions may include one or more of an operating system and applications (APPs), among others. In one instance, storing the processor instructions via the non-volatile storage device may include storing the processor instructions via the first partition. In another instance, storing the processor instructions via the non-volatile storage device may include storing the processor instructions via a second partition, different from the first partition, of the multiple partitions. In one or more embodiments, the second partition may be a hidden partition.

In one or more embodiments, the IHS may be booted. For example, the operating system of the IHS may be executed when the information handling system is booted. In one or more embodiments, the operating system of the IHS may be notified of an availability of the processor instructions that were stored via the non-volatile storage device. For example, the embedded controller may notify the operating system of an availability of the processor instructions that were stored via the non-volatile storage device. In one or more embodiments, the embedded controller may notify the operating system of the availability of the processor instructions via a management information exchange. In one example, the management information exchange may be or include a Windows Management Interface. In another example, the management information exchange may be or include a Common Information Model.

Figure 1A:
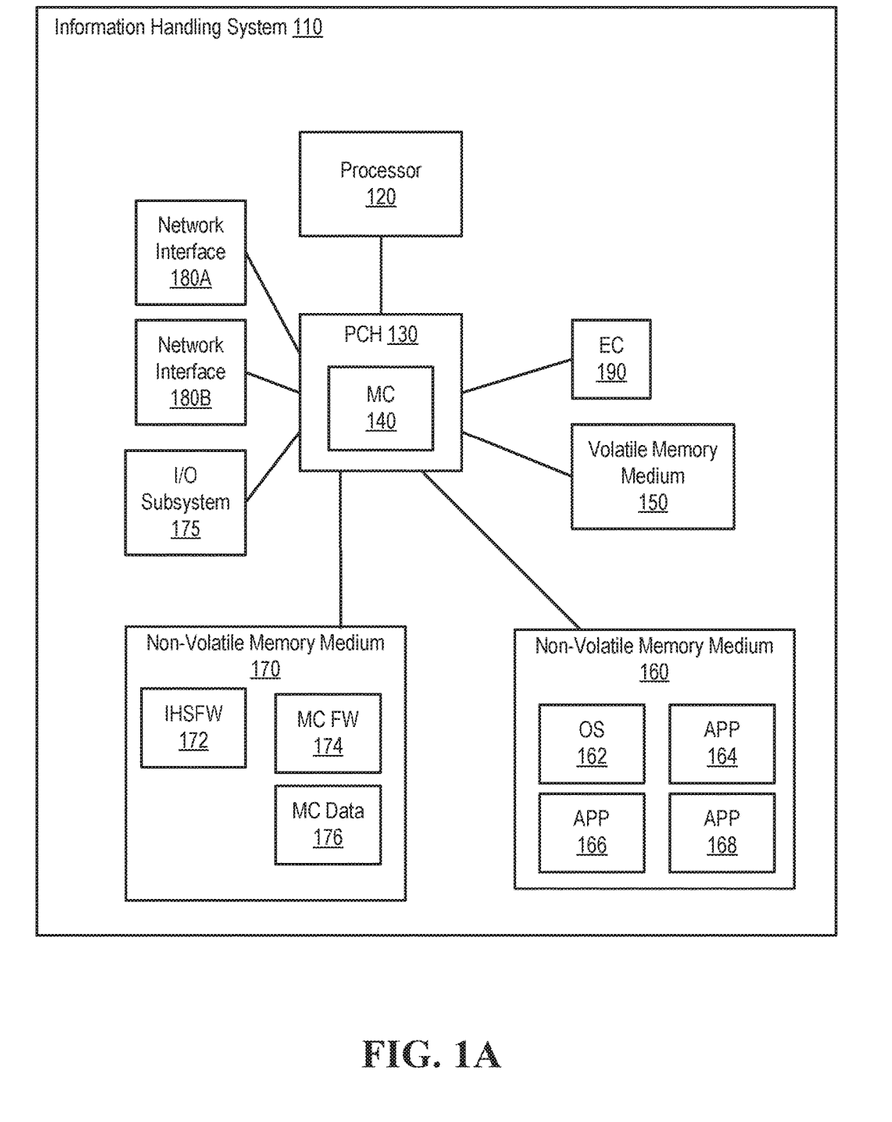
FIG. 1A illustrates an exemplary information handling system, according to one or more embodiments.

Turning now to FIG. 1A, an exemplary information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a platform controller hub (PCH) 130, a volatile memory medium 150, non-volatile memory media 160 and 170, an I/O subsystem 175, network interfaces 180A and 180B, and an embedded controller (EC) 190. As illustrated, processor 120, volatile memory medium 150, non-volatile memory media 160 and 170, I/O subsystem 175, network interfaces 180A and 180B, and EC 190 may be communicatively coupled to PCH 130. In one or more embodiments, PCH 130 may transfer information between or among two or more of processor 120, volatile memory medium 150, non-volatile memory media 160 and 170, I/O subsystem 175, and network interfaces 180A and 180B, among others not specifically illustrated. In one or more embodiments, one or more of processor 120, volatile memory medium 150, non-volatile memory media 160 and 170, I/O subsystem 175, and network interfaces 180A and 180B, among others not specifically illustrated, may be communicatively coupled to one-another via one or more PCI-Express (PCIe) root complexes and/or one or more PCIe switches.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate over a network utilizing a suitable transmission protocol and/or standard. In a second example, network interface 180A may be coupled to a wired network. In a third example, network interface 180A may be coupled to an optical network. In another example, network interface 180B may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an OS 162, and APPs 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172, MC firmware (FW) 174, and MC data 176. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. In one or more embodiments, MC FW 174 may include MC processor instructions that are executable by a MC processor of MC 140.

In one or more embodiments, one or more of MC 140 and EC 190 may be or include a microcontroller. In one example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In another example, MC 140 may be or include an Intel® Management Engine (ME). For instance, MC FW 174 may include ME firmware that may be utilized by MC 140 in implementing Intel® Active Management Technology (AMT) functionality. In one or more embodiments, one or more of MC 140 and EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

Figure 1B:
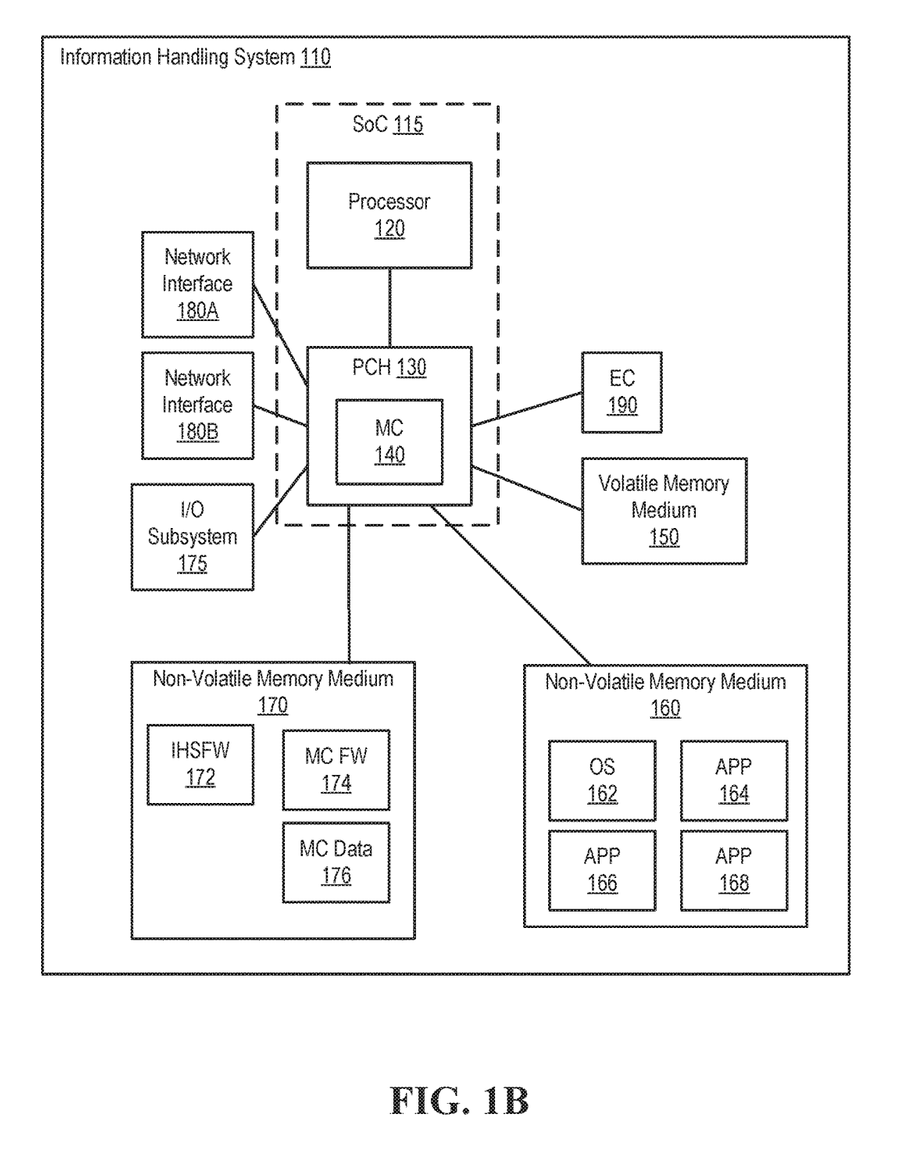
FIG. 1B illustrates an exemplary information handling system that is configured with a system-on-chip, according to one or more embodiments.

In one or more embodiments, processor 120 and PCH 130, among others, may be included in a system-on-chip (SoC). For example, as illustrated in FIG. 1B, a SoC 115 may include processor 120 and PCH 130.

Figure 2:
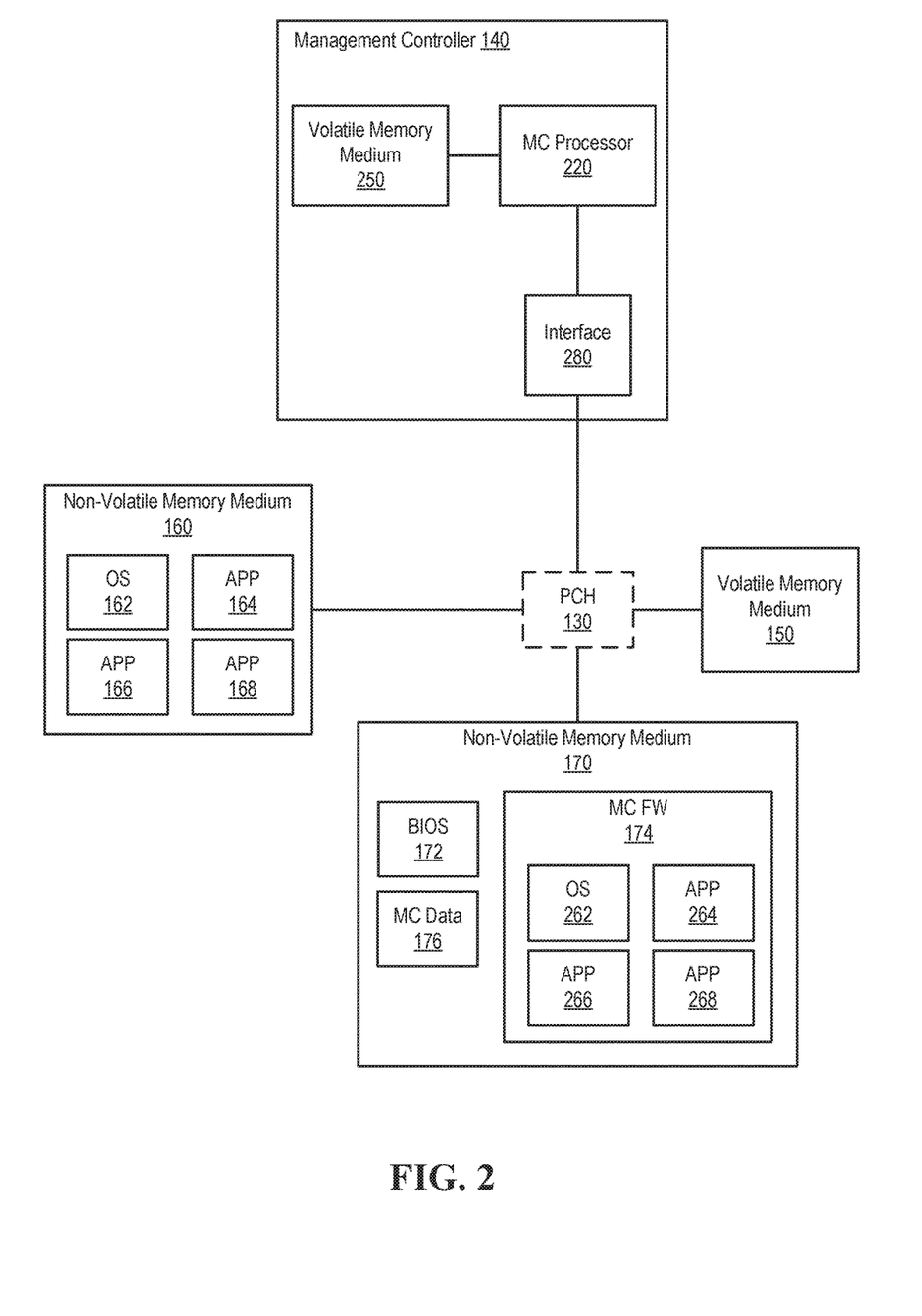
FIG. 2 illustrates an exemplary management controller, according to one or more embodiments.

Turning now to FIG. 2, an exemplary management controller is illustrated, according to one or more embodiments. As shown, MC 140 may include a MC processor 220, a volatile memory medium 250, and an interface 280. As illustrated, volatile memory medium 250 and interface 280 may be communicatively coupled to MC processor 220. In one or more embodiments, volatile memory medium 250 may include one or more structures and/or functionalities as those described with reference to volatile memory medium 150.

In one or more embodiments, MC processor 220 may be communicatively coupled to one or more of memory media 150, 160, and 170 via interface 280 and PCH 130. For example, MC processor 220 may access one or more of OS 162, APPs 164-168, IHSFW 172, MC FW 174, and MC data 176 via interface 280 and PCH 130.

As shown, MC FW 174 may include an OS 262 and APPs 264-268. For example, OS 262 may be or include a real-time operating system (RTOS). In one or more embodiments, one or more of OS 262 and APPs 264-268 may include processor instructions executable by MC processor 220. In one example, MC processor 220 may execute processor instructions of one or more of OS 262 and APPs 264-268 via non-volatile memory medium 170. In a second example, one or more portions of the processor instructions of the one or more of OS 262 and APPs 264-268 may be transferred to volatile memory medium 250, and MC processor 220 may execute the one or more portions of the processor instructions of the one or more of OS 262 and APPs 264-268 via volatile memory medium 250. In another example, one or more portions of the processor instructions of the one or more of OS 262 and APPs 264-268 may be transferred to volatile memory medium 150, and MC processor 220 may execute the one or more portions of the processor instructions of the one or more of OS 262 and APPs 264-268 via volatile memory medium 150.

In one or more embodiments, MC processor 220 may utilize MC data 176. In one example, MC processor 220 may utilize MC data 176 via non-volatile memory medium 170. In a second example, one or more portions of MC data 176 may be transferred to volatile memory medium 250, and MC processor 220 may utilize MC data 176 via volatile memory medium 250. In another example, one or more portions of MC data 176 may be transferred to volatile memory medium 150, and MC processor 220 may utilize MC data 176 via volatile memory medium 150.

In one or more embodiments, MC 140 may be utilized in implementing a system and/or service that may provide OOB management of IHS 110. In one example, an OOB system may include one or more of MC 140, MC FW 174, and MC data 176, among others. In a second example, IHS 110 may be managed remotely via MC 140, regardless of a power state of processor 120 and/or regardless of any functionality of OS 162. In one instance, processor 120 may be in a low-power state, where processor 120 may not execute instructions in the low-power state, and IHS 110 may be managed remotely via MC 140 when processor 120 is in the low-power state. In a second instance, processor 120 may be in a no-power state, where no power is applied to processor 120, and IHS 110 may be managed remotely via MC 140 when processor 120 is in the no-power state. In another instance, IHS 110 may be managed remotely via MC 140 when OS 162 is not functioning or is not installed. In another example, an APP may be utilized to remotely setup, configure, monitor, maintain, upgrade, and/or repair multiple end points (e.g., computer systems that include one or more functionalities and/or one or more structures as those described with reference to IHS 110). For instance, the APP may be utilized to remotely perform enterprise setup, configuration, monitoring, maintenance, upgrades, and/or repairs.

Figure 3:
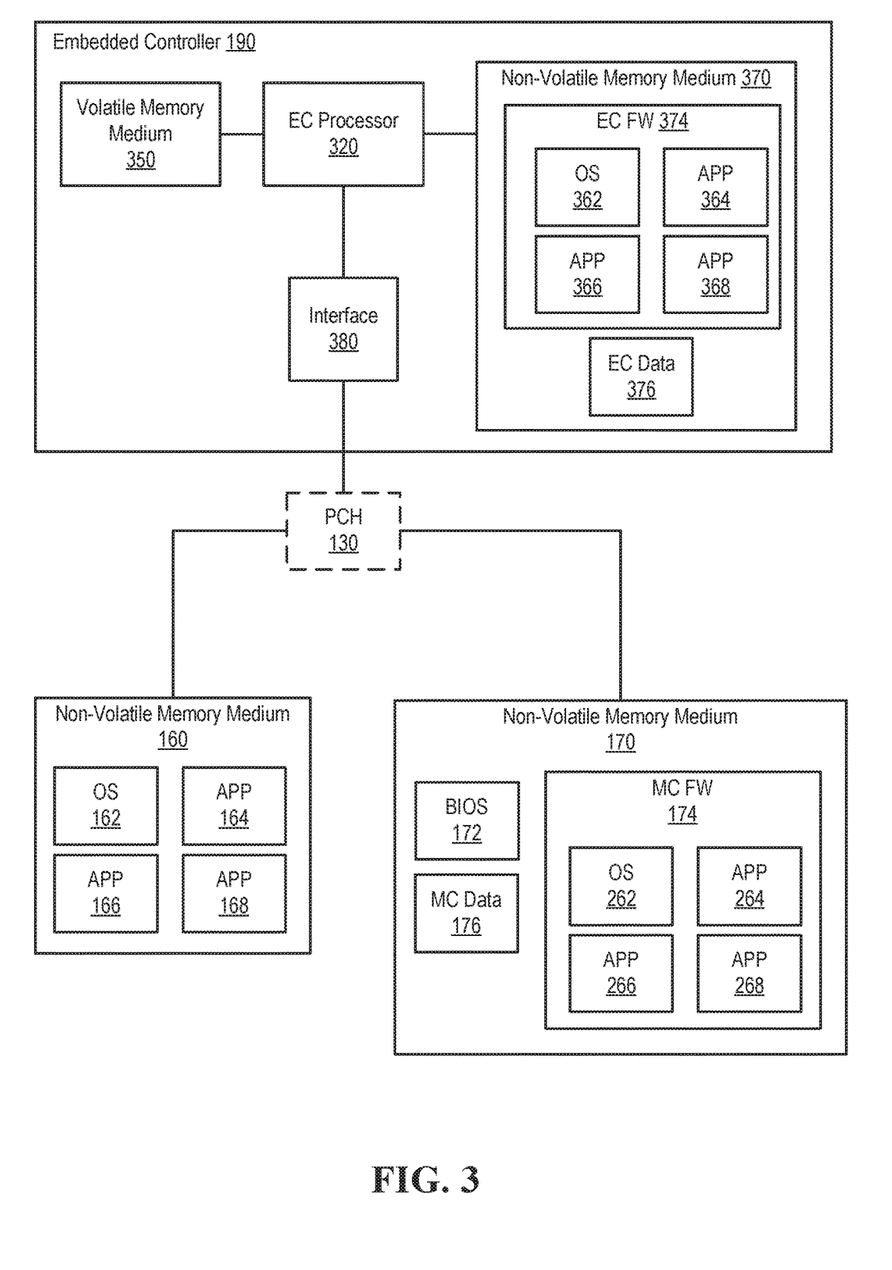
FIG. 3 illustrates an exemplary embedded controller, according to one or more embodiments.

Turning now to FIG. 3, an exemplary embedded controller is illustrated, according to one or more embodiments. As shown, EC 190 may include an EC processor 320, a volatile memory medium 350, a non-volatile memory medium 370, and an interface 380. As illustrated, non-volatile memory medium 374 may include an EC FW 374, which may include an OS 362 and APPs 364-368, and may include EC data 376. For example, OS 362 may be or include a RTOS.

In one or more embodiments, one or more of OS 362 and APPs 364-368 may include processor instructions executable by EC processor 320. In one example, EC processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and EC processor 320 may execute the one or more portions of the processor instructions of the one or more of OS 362 and APPs 364-368 via volatile memory medium 350.

In one or more embodiments, EC processor 320 may utilize EC data 376. In one example, EC processor 320 may utilize EC data 376 via non-volatile memory medium 370. In another example, one or more portions of EC data 376 may be transferred to volatile memory medium 350, and EC processor 320 may utilize EC data 376 via volatile memory medium 350.

In one or more embodiments, EC 190 may be utilized in implementing a system and/or service that may be utilized in receiving, via an out-of-band system, processor instructions, executable via MC processor 220, and storing the processor instructions via one or more of non-volatile memory media 160 and 170. For example, storing the processor instructions via one or more of non-volatile memory media 160 and 170 may include utilizing PCH 130 to store the processor instruction via one or more of non-volatile memory media 160 and 170. For instance, EC processor 320 may utilized interface 380, coupled to PCH 130, to access PCH 130, and EC processor 320 may execute instructions (e.g., OS 362, APPs 364-268, etc.) to store the processor instructions via one or more of non-volatile memory media 160 and 170. In one or more embodiments, the processor instructions, executable via processor 120, may include one or more of IHSFW 172, an update utilizable by OS 162, a firmware update for IHS 110, an APP, a device driver utilizable by OS 162, and an OS, among others.

Figure 4:
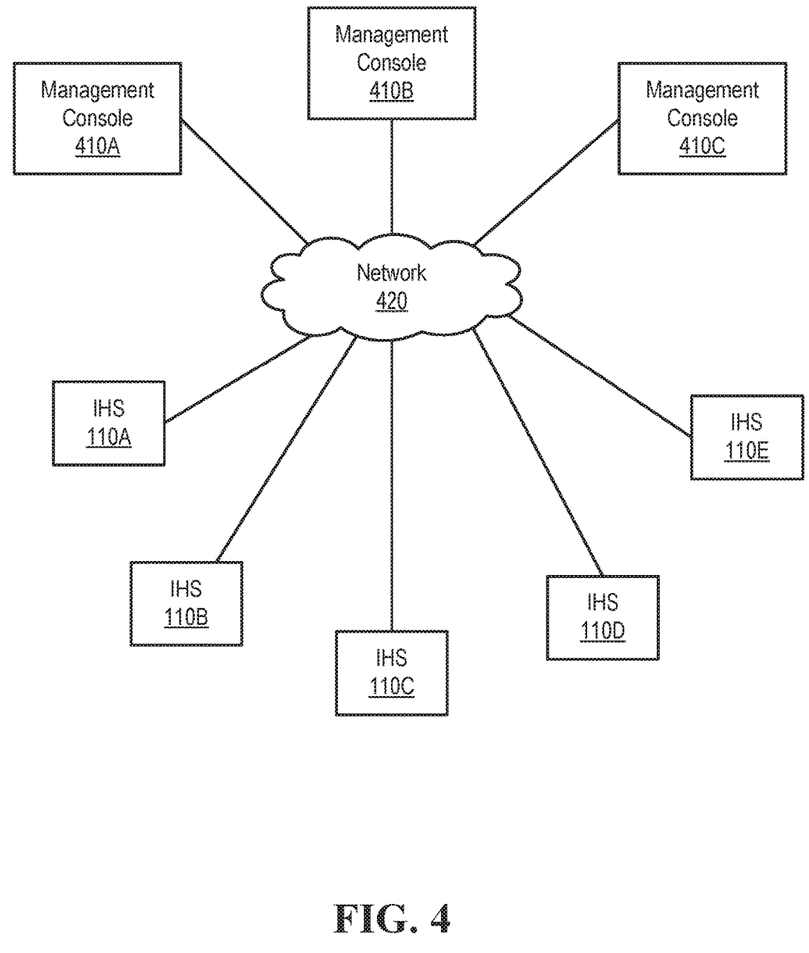
FIG. 4 illustrates an exemplary computing environment, according to one or more embodiments.

Turning now to FIG. 4, an exemplary computing environment is illustrated, according to one or more embodiments. As shown, IHSs 110A-110E and management consoles 410A-410C may be coupled to a network 420. In one or more embodiments, network 420 may include a wired network, a wireless network, an optical network, or a combination of the foregoing, among others. For example, network 420 may include and/or be coupled to various types of communications networks. For instance, network 420 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. In one or more embodiments, each of one or more management consoles 410A-410C may include one or more structures and/or functionalities as those described with reference to IHS 110.

In one or more embodiments, management console 410 may provide processor instructions, executable by processor 120, to MC 140, MC 140 may provide the processor instructions to EC 190, and EC 190 may store the processor instructions via one or more of non-volatile media 160 and 170, among others. For example, MC 140 may utilize a platform level data model (PLDM) write operation to write and/or provide one or more portions of the processor instructions to EC 190. For instance, MC 140 may utilize a multipart transfer to write and/or provide the processor instructions to EC 190. In one or more embodiments, a PLDM definition for transferring data from MC 140 to EC 190 is provided via Table 1 and Table 2.

TABLE 1

| Byte | Type | Request Data |
|---|---|---|
| 0 | enum8 | DeviceType<br>The Device type may indicate what device data is being transferred.<br>Possible values: {OpaqueData=0x1, etc.} |
| 1 | uint8 | DeviceID<br>DeviceID may be an identifier of a target of the CIM_OpaqueManagementData write command |
| 2 | enum8 | TransferOperationFlag<br>May indicates whether or not this is a request to write the next part of a multi-part transfer.<br>Possible values: {Start=0x01, Middle=0x02, End=0x04, StartAndEnd = 0x05, etc.} |
| 3:4 | uint16 | DataTransferHandle<br>This handle may be ignored by a responder when the TransferOperationFlag may be set to 1 (e.g., "Start") or 5 (e.g., "StartAndEnd"). This handle may have a value representing what block of data is being sent. |
| 5:63 | binary | Payload |

TABLE 2

| Byte | Type | Response Data |
|---|---|---|
| 0 | enum8 | CompletionCode<br>Possible values:<br>{PLDM_BASE_CODES,<br>INVALID_DATA_TRANSFER_HANDLE=0x80,<br>INVALID_TRANSFER_OPERATION_FLAG=0x81,<br>NO_DEVICE_DATA_AVAILABLE=0x83,<br>INVALID_DEVICE_TYPE=0x84, etc.} |
| 1:2 | uint16 | DataTransferHandle<br>A handle that may be utilized to identify and acknowledge a portion of a data transfer. |

In one or more embodiments, management console 410 may provide processor instructions, executable by processor 120, to MC 140 via a protocol that provides a measure of reliability. For example, the protocol may include a transmission control protocol (TCP). In one or more embodiments, management console 410 may provide processor instructions, executable by processor 120, to MC 140 via a protocol that provides a measure of security and/or privacy. For example, providing the processor instructions may include utilizing one or more of a hypertext transfer protocol (HTTP), a HTTP secure (HTTPS), a secure socket layer (SSL) protocol, and a transport layer security (TLS) protocol, among others, via TCP.

In one or more embodiments, one or more of IHSs 110A-110E may be outside a secure computer environment. For example, the secure computer environment may be behind one or more firewalls. For instance, the secure computing environment may include one or more of management consoles 310A-310C, and one or more of management consoles 310A-310C may provide the processor instructions to one or more of IHSs 110A-110E outside the secure computer environment via respective OOB systems of IHSs 110A-110E. In one or more embodiments, receiving the processor instructions may include receiving the processor instructions via a secure protocol. For example, MC 140 may utilize one or more of HTTPS, SSL, and TLS, among others, in receiving the processor instructions.

Figure 5A:
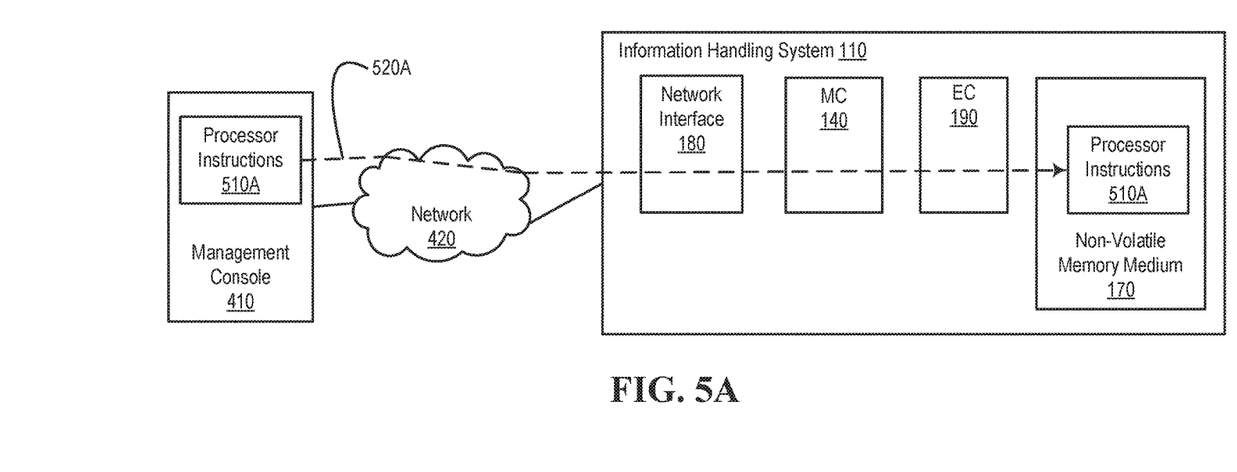
FIGS. 5A-5D provide exemplary diagrams of receiving and storing processor instructions.
Figure 5B:
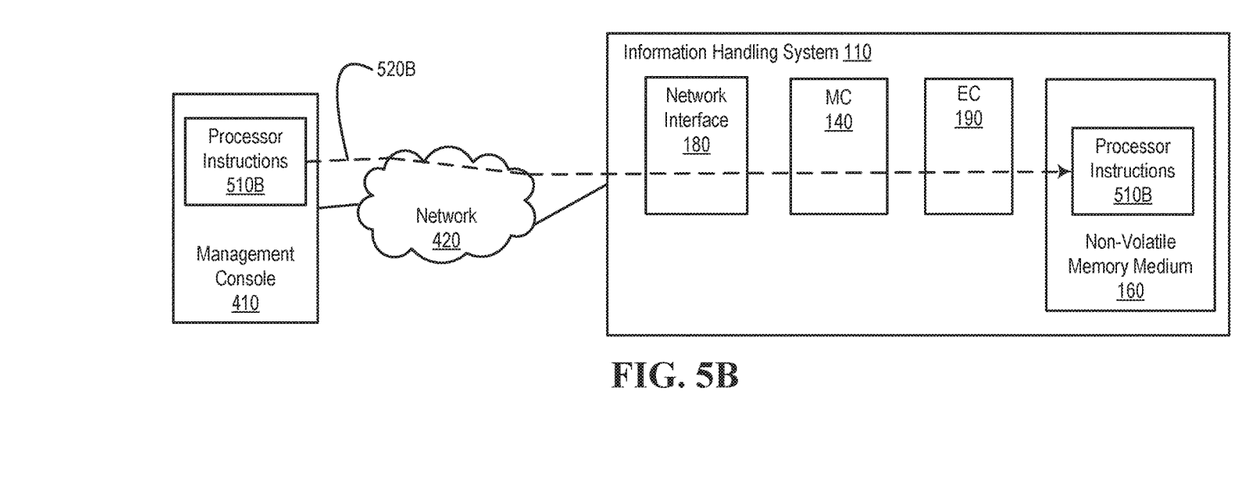
Figure 5C:
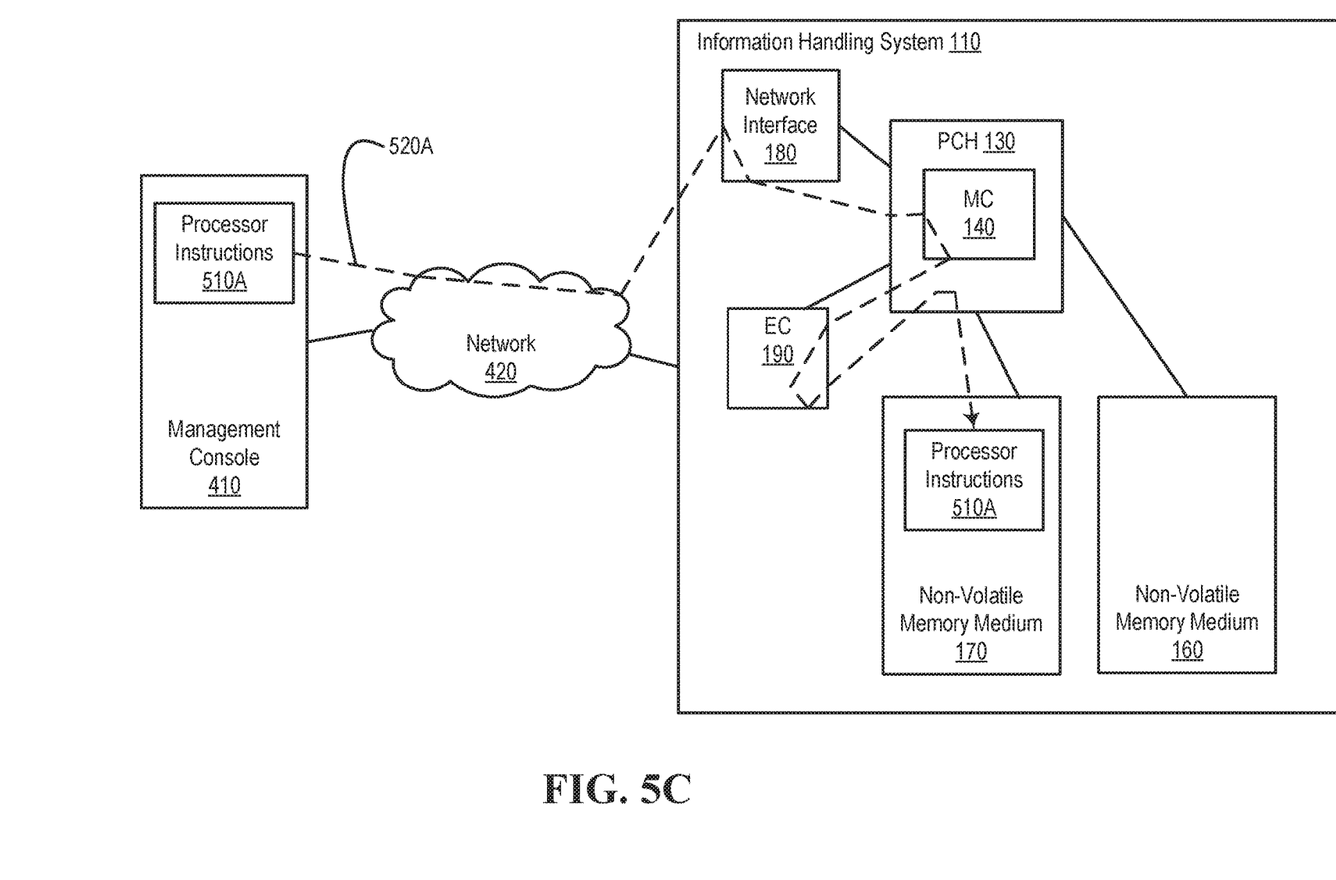

Turning now to FIGS. 5A-5C, exemplary block diagrams of providing and receiving processor instruction via an OOB system is illustrated, according to one or more embodiments. As shown in FIG. 5A, processor instructions 510A, executable by processor 120, may travel via a logical path 520A, and as illustrated in FIG. 5B processor instructions 510B, executable by processor 120, may travel via a logical path 520B. For example, logical path 520 illustrates that management console 410 may provide processor instructions 510 to IHS 110.

As illustrated in FIG. 5C, MC 140 may receive processor instructions 510 from management console 410, according to one or more embodiments. In one example, MC 140 may receive processor instructions 510 from management console 410 via one or more of network 420 and network interface 180. In another example, MC 140 may receive processor instructions via a web-services management (WS-MAN) data transfer. In one or more embodiments, EC 190 may receive processor instructions 510 via a multipart transfer operation. For example, MC 140 may utilize the multipart transfer operation to provide processor instructions 510 to EC 190. For instance, the multipart transfer operation may be or include a CIM_OpaqueManagementData write command.

Figure 5D:
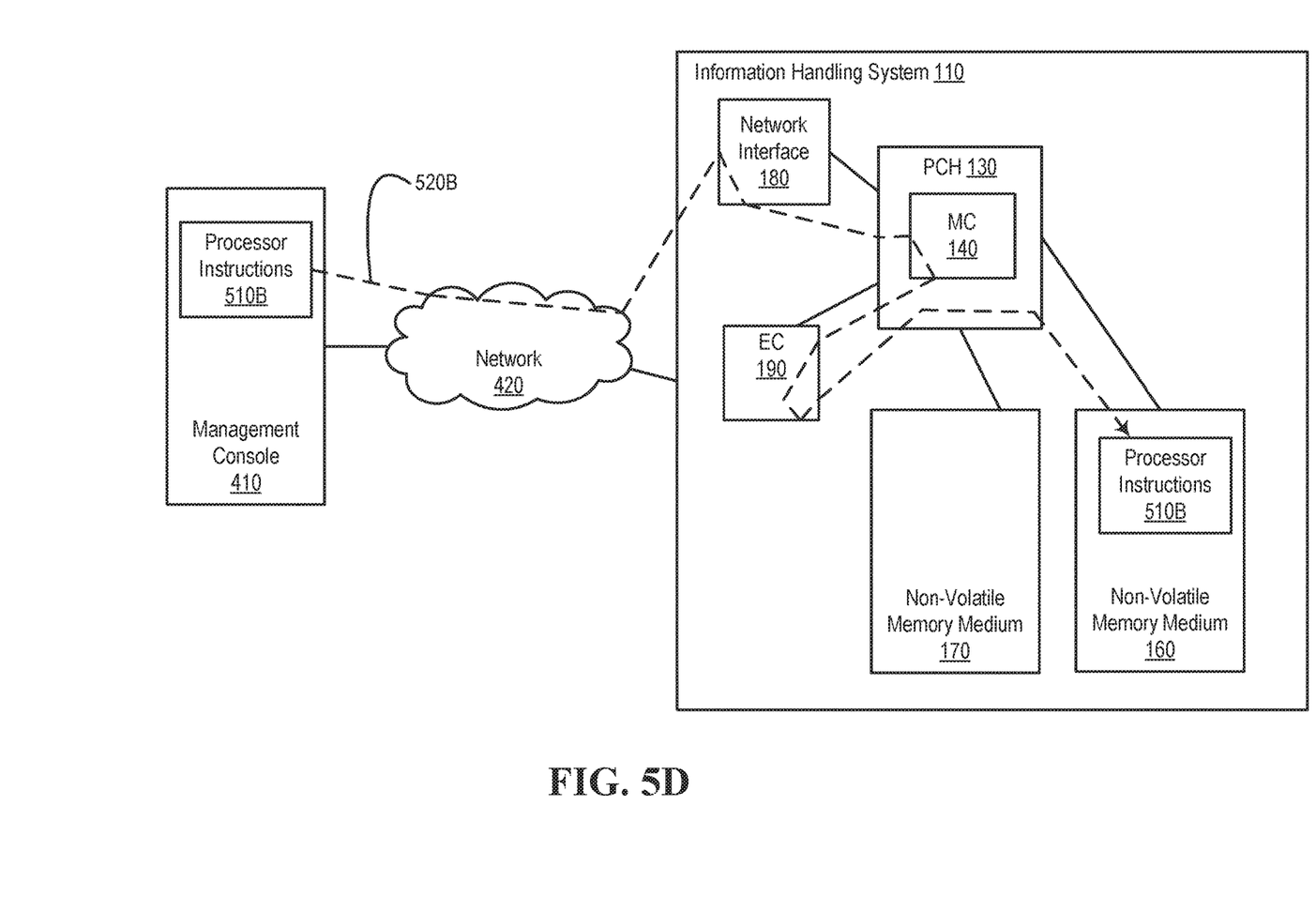

As illustrated in FIGS. 5A and 5C, EC 190 may store processor instructions 510A via non-volatile memory medium 170. As shown in FIG. 5C, EC 190 may utilize PCH 130 in storing processor instructions 510A via non-volatile memory medium 170, according to one or more embodiments. As illustrated in FIGS. 5B and 5D, EC 190 may store processor instructions 510B via non-volatile memory medium 160. As shown in FIG. 5D, EC 190 may utilize PCH 130 in storing processor instructions 510B via a non-volatile memory medium 160, according to one or more embodiments.

In one or more embodiments, non-volatile memory medium 160 may include multiple partitions. In one example, a first partition of the multiple partitions may store one or more of OS 162 and APPs 164-168, among others. In another example, a second partition, different from the first partition, of the multiple partitions may store processor instructions 510, among others. For instance, the second partition may be a hidden partition. In one or more embodiments, EC 190 may store processor instructions 510 via one or more of the first partition and the second partition, among others.

As demonstrated in FIGS. 5-5D, one or more of processor 120 and OS 162, among others, may not be involved in IHS 110 receiving and storing processor instructions 510, according to one or more embodiments. For example, an OOB system may include one or more of MC 140 and EC 190, and the OOB system or one or more of elements of the OOB system may perform tasks independently from one or more of processor 120 and OS 162, among others. For instance, one or more of MC 140 and EC 190 may perform tasks while processor 120 is not executing any processor instructions.

In one or more embodiments, one or more elements of IHS 110 may be impaired or inoperable. In one example, OS 162 may be impaired or inoperable, and program instructions 510 may include one or more of a new OS and a remedy and/or a repair to OS 162, among others. In another example, IHSFW 172 may be impaired or inoperable, and program instructions 510 may include one or more of new IHSFW and a remedy and/or a repair to IHSFW 172, among others. In one or more embodiments, EC 190 may receive and store processor instructions 510 via a first non-volatile memory medium and transfer processor instructions 510 from the first non-volatile memory medium to a second non-volatile memory medium, different from the first non-volatile memory medium. In one example, EC 190 may receive and store processor instructions 510 via non-volatile memory medium 160 and transfer processor instructions 510 to non-volatile memory medium 170. For instance, processor instructions 510 may include new IHSFW for IHS 110, and EC 190 may receive and store the new IHSFW via non-volatile memory medium 160 and transfer the new IHSFW to non-volatile memory medium 170. In another example, EC 190 may receive and store processor instructions 510 via non-volatile memory medium 170 and transfer processor instructions 510 to non-volatile memory medium 160. For instance, processor instructions 510 may include a new boot loader for IHS 110, and EC 190 may receive and store the new boot loader via non-volatile memory medium 170 and transfer the new boot loader to non-volatile memory medium 160 (e.g., accessible by processor 120 during a boot sequence). In one or more embodiments, EC 190 may transfer processor instructions 510 from the first non-volatile memory medium to the second non-volatile memory medium after IHS boots or is at a point in a boot sequence.

In one or more embodiments, processor instructions 510 may include one or more of an update (e.g., an OS update, an APP update, an IHSFW update, a firmware update for IHS 110, a device driver update, a security update, etc.), IHSFW, an OS, an OS component, a device driver, and an APP, among others. For example, management console 410 may provide the one or more of the update, the IHSFW, the OS, the OS component, the device driver, and the APP, among others, to IHS 110 when IHS 110 is in a low-power mode and/or without user interaction. For instance, one or more of processor 120 and OS 162, among others, may not be involved in receiving and/or storing the one or more of the update, the IHSFW, the OS, the OS component, the device driver, and the APP, among others.

In one or more embodiments, EC 190 may determine that IHS 110 is impaired or inoperable and may remedy and/or repair IHS 110. In one example, EC 190 may provide a request to management console 410. For instance, the request may include a request for processor instructions 510. In another example, EC 190 may access processor instructions 510 and apply processor instructions where applicable. For instance, processor instructions 510 may include IHSFW, and EC may apply the IHSFW such that processor 120 may utilize the IHSFW, which may permit IHS 110 to function. In one or more embodiments, IHS 110 may not be impaired or inoperable, and EC 190 may apply at least one update while IHS 110 is in a low-power mode (e.g., a low-power state). For example, the low-power mode may include a mode where processor 120 is in a low-power mode (e.g., a low-power state) and/or is not processing processor instructions.

In one or more embodiments, OS 162 may include a management information exchange. In one example, the management information exchange may permit multiple components to exchange management information associated with managed elements and/or may permit control and/or management of the managed elements. In another example, the management information exchange may a driver and/or a driver model that may provide an OS interface through which managed elements (e.g., elements of IHS 110) may provide information and/or notifications, among others. In one instance, the management information exchange may be or include a Windows Management Interface (WMI) for Advanced Configuration and Power Interface (ACPI) (available from Microsoft Corporation). In another instance, the management information exchange may be or include a Common Information Model (CIM) (available via the Distributed Management Task Force). In one or more embodiments, EC 190 may notify OS 162, via the management information exchange, that processor instructions 510 are available. For example, after OS 162 receives a notification from EC 190, OS 162 may utilize processor instructions 510. For instance, EC 190 may monitor a boot sequence of IHS 110, may determine that OS 162 may receive a notification, and may provide a notification to OS 162 that processor instructions 510 are available via one or more of non-volatile media 160 and 170.

In one or more embodiments, EC 190 may interface with IHSFW 172, which may interface with the management information exchange. For example, EC 190 may provide a notification, indicating that processor instructions 510 are available, to IHSFW 172, and IHSFW may provide the notification to the management information exchange. For instance, an APP (e.g., an APP of APPs 164-166) may subscribe to a management information exchange notification that indicates that processor instructions 510 are available, and when the management information exchange receives the notification indicating that processor instructions 510 are available, the APP may be started and/or launched. In one or more embodiments, the APP may utilize processor instructions 510. For example, processor instructions 510 may include an update, and the APP may install and/or run the update.

Figure 6:
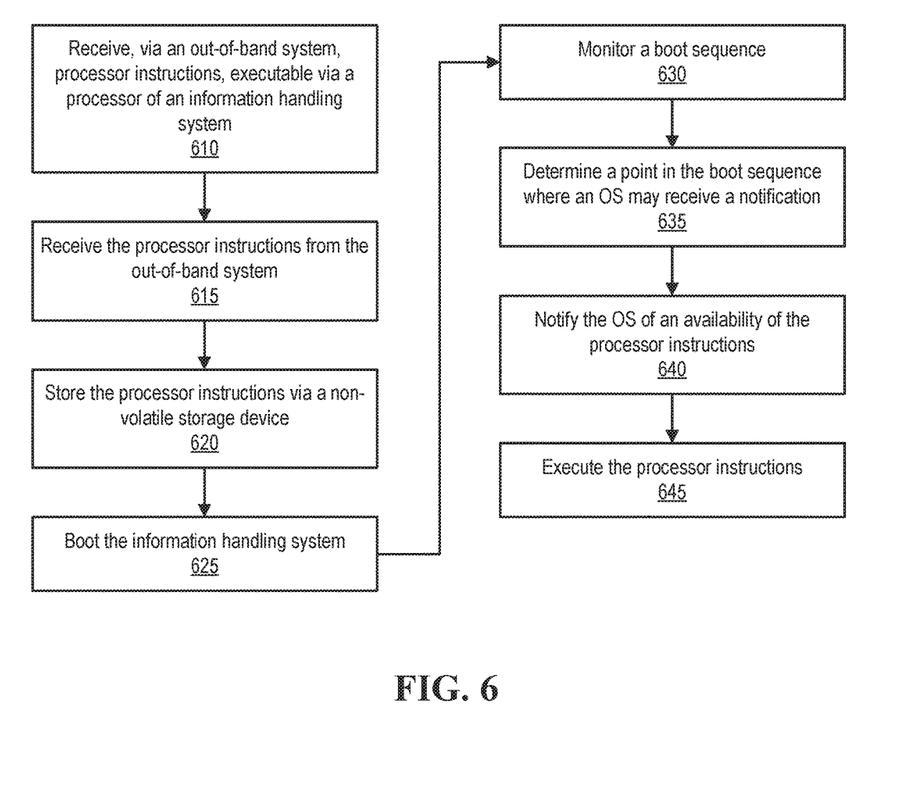
FIG. 6 illustrates an exemplary method of operating an information handling system, according to one or more embodiments.

Turning now to FIG. 6, a method of operating an information handling system is illustrated, according to one or more embodiments. At 610, processor instructions, executable via a processor of an information handling system, may be received via an out-of-band system of the information handling system. For example, MC 140 may receive processor instructions 510, executable via processor 120 of IHS 110. For instance, MC 140 may receive processor instructions 510 from management console 410 via network 420. In one or more embodiments, processor instructions 510 may include at least one of IHSFW, an APP, a firmware update for IHS 110, an OS, a device driver configured to be utilized with the OS or another OS (e.g., the other OS being OS 162), a component configured to be utilized with the OS or the other OS, and an update configured to be utilized with the OS or the other OS, among others.

At 615, the processor instructions may be received from the out-of-band system. For example, EC 190 of IHS 110 may receive processor instructions 510 from MC 140. For instance, EC 190 of IHS 110 may receive processor instructions 510 from MC 140 via a PLDM write operation. In one or more embodiments, the write operation may be or include a multipart transfer operation to provide processor instructions 510 to EC 190.

At 620, the processor instructions may be stored via a non-volatile storage device. For example, EC 190 may store processor instructions 510 via the non-volatile storage device. For instance, EC 190 may utilize PCH 130 in storing processor instructions 510 via the non-volatile storage device. In one or more embodiments, the non-volatile storage device may be or include a non-volatile memory medium. In one example, the non-volatile memory medium may be or include non-volatile memory medium 160. In another example, the non-volatile memory medium may be or include non-volatile memory medium 170. In one or more embodiments, the non-volatile memory medium may include multiple partitions. For example, a first partition of the multiple partitions may include one or more of an OS and APPs, among others. In one instance, storing the processor instructions via the non-volatile memory medium may include storing the processor instructions via the first partition. In another instance, storing the processor instructions via the non-volatile memory medium may include storing the processor instructions via a second partition, different from the first partition, of the multiple partitions. In one or more embodiments, the second partition may be a hidden partition.

At 625, the information handling system may be booted. For example, IHS 110 may be booted. For instance, OS 162 may be executed when IHS 110 is booted. At 630, a boot sequence may be monitored. For example, EC 190 may monitor the boot sequence. At 635, a point in the boot sequence where an OS (e.g., OS 162, a new OS, etc.) is operable to receive a notification may be determined. For example, EC 190 may determine the point in the boot sequence where the OS is operable to receive the notification. In one or more embodiments, determining the point in the boot sequence where the OS is operable to receive the notification may include receiving information from the OS.

At 640, an OS of the information handling system may be notified of an availability of the processor instructions. For example, EC 190 may provide information to OS 162 that notifies OS 162 of an availability of processor instructions 510. In one instance, processor instructions 510A may be available via non-volatile memory medium 170. In another instance, processor instructions 510B may be available via non-volatile memory medium 160. In one or more embodiments, EC 190 may notify OS 162 of the availability of processor instructions 510 via at least one of WMI and CIM, among others. At 645, processor 120 may execute the processor instructions.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a processor;
   a non-volatile memory medium communicatively coupled to the processor, including:
      i) a first partition that stores an operating system, the first partition accessible by the processor, and
      ii) a second partition, different from the first partition, that stores instructions executable by the processor;
   an embedded controller communicatively coupled to the processor;
   a management controller communicatively coupled to the processor and to the embedded controller;
   a network interface coupled to the processor and to the management controller;
   wherein the management controller receives, independently of the processor and via the network interface, processor instructions executable via the processor;
   wherein the embedded controller, independently of the processor:
      receives the processor instructions via the management controller, the processor instructions including boot loader instructions;
      initially stores the processor instructions via the second partition of the non-volatile memory medium; and
      transfer the processor instructions from the second partition of the non-volatile memory medium to the first partition of the non-volatile memory medium.

2. The information handling system of claim 1, wherein the processor instructions include at least one of information handling system firmware, an application, a firmware update for the information handling system, a new operating system, a device driver configured to be utilized with an operating system of the information handling system, a component configured to be utilized with the operating system, and an update configured to be utilized with the operating system.

3. The information handling system of claim 1, wherein the non-volatile memory medium includes a plurality of partitions.

4. The information handling system of claim 1, wherein the processor is not executing any processor instructions while the management controller receives the processor instructions executable and while the embedded controller receives the processor instructions via the management controller and stores the processor instructions via the non-volatile memory medium.

5. The information handling system of claim 1, wherein after the embedded controller stores the processor instructions, the information handling system boots.

6. The information handling system of claim 5, wherein the embedded controller provides information to an operating system of the information handling system that indicates that the processor instructions are available via the non-volatile memory medium.

7. The information handling system of claim 6, wherein the embedded controller determines a point in a boot sequence where the operating system is operable to receive the information that indicates that the processor instructions are available via the non-volatile memory medium.

8. The information handling system of claim 1, wherein after the embedded controller stores the processor instructions, the embedded controller stores the processor instructions via another non-volatile memory medium that is access by the processor upon booting.

9. The information handling system of claim 1,
wherein the information handling system stores information handling system firmware that is at least one of impaired and inoperable; and
wherein the processor instructions include at least one of a repair to the information handling system firmware and new information handling system firmware.

10. The information handling system of claim 1, further comprising:
a platform controller hub communicatively coupled to the embedded controller and to the non-volatile memory medium;
wherein when the embedded controller stores the processor instructions via the non-volatile memory medium, the embedded controller utilizes the platform controller hub to store the processor instructions via the non-volatile memory medium.

11. A method of operating an information handling system, comprising:
a management controller of the information handling system receiving, independently of a processor of the information handling system and via a network interface of the information handling system, processor instructions executable via the processor;
an embedded controller of the information handling system receiving, independently of the processor, the processor instructions from the management controller, independently of the processor, the processor instructions including boot loader instructions;
the embedded controller:
initially storing, independently of the processor, the processor instructions via a second partition of a non-volatile memory medium of the information handling system;
transferring the processor instructions from the second partition of the non-volatile memory medium to a first partition of the non-volatile memory medium, different from the second partition, wherein the first partition stores an operating system and is accessible by the processor.

12. The method of claim 11, wherein the processor instructions include at least one of information handling system firmware, an application, a firmware update for the information handling system, an operating system, a device driver configured to be utilized with an operating system of the information handling system, a component configured to be utilized with the operating system, and an update configured to be utilized with the operating system.

13. The method of claim 11,
wherein the non-volatile memory medium includes a plurality of partitions.

14. The method of claim 11, wherein the processor is not executing any processor instructions while the management controller receives the processor instructions executable and while the embedded controller receives the processor instructions from the management controller and stores the processor instructions via the non-volatile memory medium.

15. The method of claim 11, further comprising:
after the embedded controller storing the processor instructions via the non-volatile memory medium, booting the information handling system.

16. The method of claim 15, further comprising:
providing information to an operating system of the information handling system that indicates that the processor instructions are available via the non-volatile memory medium.

17. The method of claim 16, further comprising:
determining that the operating system is operable to receive the information that indicates that the processor instructions are available via the non-volatile memory medium.

18. The method of claim 11, further comprising:
after the embedded controller storing the processor instructions via non-volatile memory medium, storing the processor instructions via another non-volatile memory medium that is accessible by the processor upon booting.

19. The method of claim 11,
wherein the information handling system stores information handling system firmware that is at least one of impaired and inoperable; and
wherein the processor instructions include at least one of a repair to the information handling system firmware and new information handling system firmware.

20. The method of claim 11, wherein the embedded controller storing the processor instructions via the non-volatile memory medium of the information handling system includes the embedded controller utilizing a platform controller hub of the information handling system to store the processor instructions via the non-volatile memory medium of the information handling system.

* * * * *